(12) United States Patent
Srinivasan et al.

(10) Patent No.: US 9,065,681 B2
(45) Date of Patent: Jun. 23, 2015

(54) PARKING AND UN-PARKING OF CONVERSATIONS IN MULTIPLE MODALITIES

(75) Inventors: Srivatsa K. Srinivasan, Renton, WA (US); Krishnamurthy Ganesan, Redmond, WA (US); Timothy M. Moore, Bellevue, WA (US); Andreas Strebel, Staufen (CH); Brian S. Stucker, Redmond, WA (US); Stephane L. Taine, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 882 days.

(21) Appl. No.: 12/690,226

(22) Filed: Jan. 20, 2010

(65) Prior Publication Data

US 2011/0179107 A1    Jul. 21, 2011

(51) Int. Cl.
| | |
|---|---|
| *G06F 15/16* | (2006.01) |
| *H04L 12/58* | (2006.01) |
| *H04M 3/428* | (2006.01) |
| *H04M 7/00* | (2006.01) |
| *H04L 29/06* | (2006.01) |
| *H04L 12/18* | (2006.01) |

(52) U.S. Cl.
CPC ........... *H04L 12/582* (2013.01); *H04L 12/1813* (2013.01); *H04L 51/046* (2013.01); *H04M 3/428* (2013.01); *H04M 7/006* (2013.01); *H04L 65/1063* (2013.01); *H04L 65/1083* (2013.01); *H04L 65/1096* (2013.01)

(58) Field of Classification Search
CPC .................................. H04M 3/00; H04M 7/00
USPC .................. 709/227, 229; 455/414.1, 415
See application file for complete search history.

(56) References Cited

U.S. PATENT DOCUMENTS

| | | | | |
|---|---|---|---|---|
| 5,970,134 | A * | 10/1999 | Highland et al. ........ | 379/265.02 |
| 6,044,144 | A * | 3/2000 | Becker et al. ............ | 379/265.02 |
| 7,586,908 | B2 | 9/2009 | Nelson | |
| 2005/0174990 | A1 * | 8/2005 | Riemann et al. .............. | 370/352 |
| 2009/0086950 | A1 | 4/2009 | Vendrow | |
| 2010/0216435 | A1 * | 8/2010 | Martin et al. .............. | 455/414.1 |

FOREIGN PATENT DOCUMENTS

WO    9838780 A1    9/1998

OTHER PUBLICATIONS

"NEAX 2000 IPS D Term Series I"—NEC Oct. 2000 http://www.integratelecom.com/resources/Assets/neax2000-dterm-i-and-ip-ug.pdf.*

(Continued)

*Primary Examiner* — Randy Scott
(74) *Attorney, Agent, or Firm* — Andrew Smith; Jim Ross; Micky Minhas

(57) ABSTRACT

A park request is received from a first computing system. The park request is a request to park a conversation between a user of the first computing system and a user of a second computing system. The park request conforms to a protocol that supports parking and unparking of conversations having a first modality and conversations having a second modality. Furthermore, an unpark request is received from a third computing system. The unpark request is a request to unpark the conversation. Referral information is sent to the third computing system. The referral information enables the third computing system to establish a communication session to carry the conversation.

20 Claims, 4 Drawing Sheets

(56) References Cited

OTHER PUBLICATIONS

"Asterik PBX Configuration for Grandstream Phones"—Grandstream, Jun. 2000 http://www.grandstream.com/products/gxp_series/general/documents/gxp_interop_asterisk.pdf.*

"3CX Assistant / VoIP Client—Easy Call Control from your desktop!" 3CX Software based PBX for Windows®, © 2009, 1 page.

"Multimedia PC Client Quick Reference," Cypress Communications, accessed on Oct. 30, 2009, accessed at: http://cypresscom.net/pdf/C4%20Multimedia%20PC%20Client%20Quick%20Ref%20050306.pdf; 4 pages.

"ParkedCall (dialplan application)," AsteriskGuru.Com, accessed on Oct. 29, 2009, accessed at: http://www.asteriskguru.com/tutorials/parkedcall.html; 5 pages.

Proctor, M.; An Approach to Call Park/Retrieve using SIP Draft-Procter-Bliss-Call-Park-Extension-00, Network Working Group, Feb. 26, 2007, 12 pages.

\* cited by examiner

PARKING AND UN-PARKING OF CONVERSATIONS IN MULTIPLE MODALITIES

BACKGROUND

When a person (i.e., an initiating user) makes a telephone call, the telephone call might not be answered by a person with whom the person wants to speak (i.e., a target user). Rather, the telephone call might be answered by another person (i.e., an answering user). For example, the initiating user might want to speak with a trademark attorney. In this example, the initiating user might be initially connected to a receptionist instead of a trademark attorney.

When the answering user receives the telephone call, the answering user can first try to transfer the telephone call to the target user. If the target user does not answer his or her phone, the answering user parks the telephone call. The answering user then uses a public address system to page the target user. The target user can unpark the telephone call by dialing an orbit. When the target user unparks the telephone call, the initiating user and the target user are able to converse.

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

In one aspect, a method comprises receiving, by a parking server, a park request from a first computing system. The park request is a request to park a conversation between a user of the first computing system and a user of a second computing system. The park request conforms to a protocol that supports parking and unparking of conversations having a first modality and conversations having a second modality. The method also comprises receiving, by the parking server, an unpark request from a third computing system. The unpark request is a request to unpark the conversation. In addition, the method comprises sending, by the parking server, referral information to the third computing system. The referral information enables the third computing system to establish a communication session to carry the conversation.

In another aspect, a method comprises receiving, by a first computing system, a park notification message that indicates that a conversation has been parked. The park notification message specifies an orbit associated with the conversation. In addition, the method comprises sending, by the first computing system, an unpark request. The unpark request is a request to unpark the conversation. The unpark request specifies the orbit. Furthermore, the method comprises receiving, by the first computing system, referral information. In addition, the method comprises using the referral information to establish a communication session to carry the conversation. The communication session is between the first computing system and a second computing system.

In yet another aspect, a computing system comprises a processing system. In addition, the computing system comprises a memory that stores software instructions that, when executed by the processing system, cause the computing system to exchange conversation data with a second computing system. The conversation data represents information in a conversation between a first user and a second user. The first user is a user of the computing system. The second user is a user of the second computing system. The conversation has a plurality of modalities. In addition, the software instructions, when executed by the processing system, cause the computing system to send an invitation message to a parking server. The invitation message is a request to open a communication session between the computing system and the parking server. The invitation message comprises a park-request element. The park-request element is a request to park the conversation. The park-request element is an XML element conforming to an XML schema. The XML schema allows a software developer to extend the XML schema such that park-request elements are allowed to include elements that specifies information needed to support parking and unparking of conversations having supplemental modalities. The park-request element includes elements that specify data needed by the parking server to enable a target computing system to establish with the second computing system a communication session to carry the conversation. The plurality of modalities includes at least one of the following modalities: voice, video conferencing, instant messaging, chat, and application sharing. In addition, the software instructions, when executed by the processing system, further cause the computing system to receive a message indicating an orbit that identifies a target user. Furthermore, the software instructions, when executed by the processing system, cause the computing system to receive an information message from the parking server. The information message includes an unpark-notification element that specifies a reason why the conversation was unparked. The unpark-notification element conforms to a second XML schema. The second XML schema specifies that the unpark-notification element is allowed to indicate one of the following reasons why the conversation was unparked: retrieval, hang-up, ringback, fallback, and drop.

DETAILED DESCRIPTION

Figure 1:
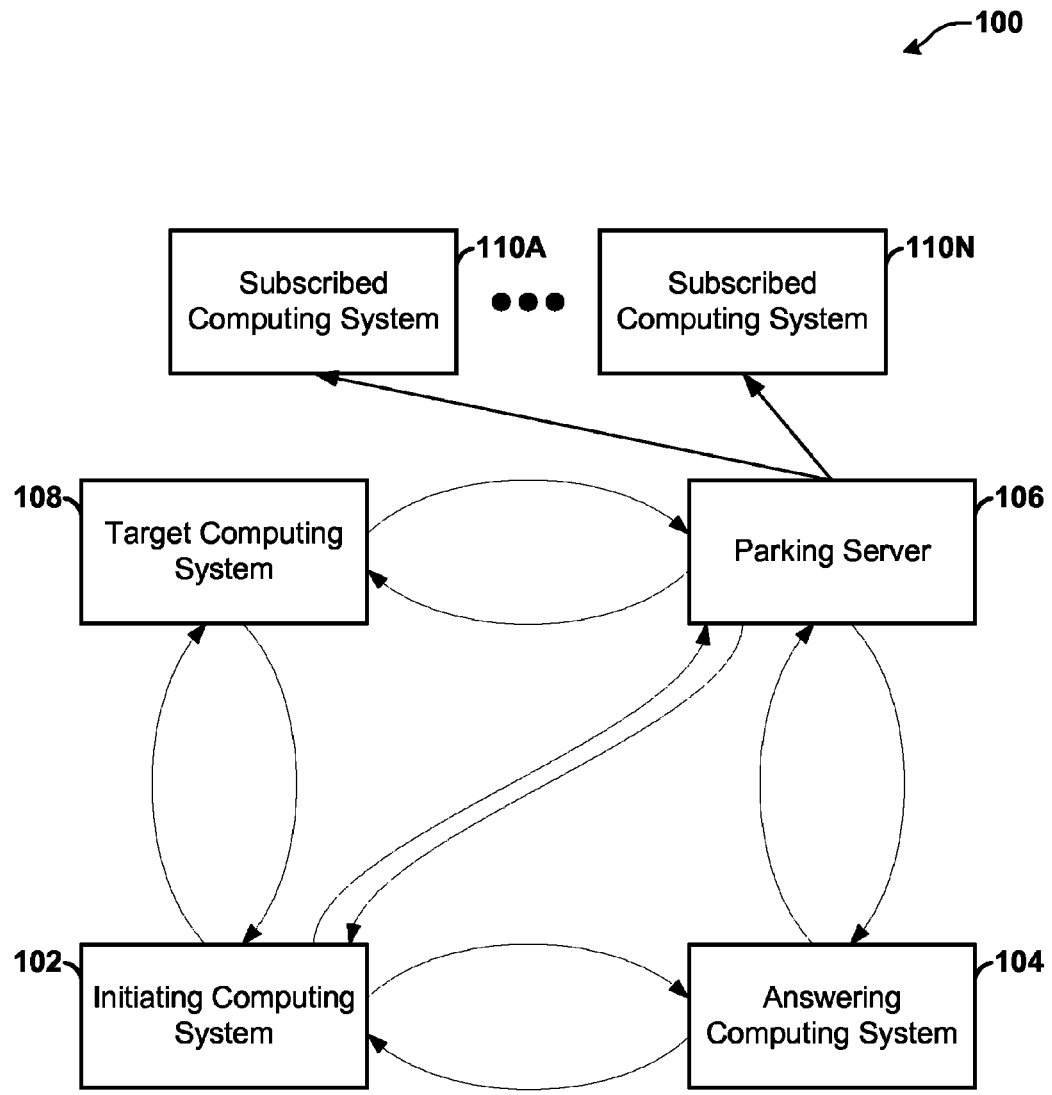
FIG. 1 is a block diagram illustrating an example system in which conversations can be parked and unparked.

FIG. 1 is a block diagram illustrating an example system 100 in which conversations can be parked and unparked. The system 100 is merely one embodiment. Other embodiments include more or fewer computing devices, computing systems, networks, and other components.

As illustrated in the example of FIG. 1, the system 100 includes an initiating computing system 102, an answering computing system 104, a parking server 106, a target computing system 108, and subscribed computing systems 110A-110N (collectively, "subscribed computing systems 110"). The initiating computing system 102 is a computing system used by an initiating user. The answering computing system 104 is a computing system used by an answering user. The parking server 106 is a computing system that facilitates parking of conversations. The target computing system 108 is a computing system used by a target user. The subscribed computing systems 110 are computing systems that receive notification messages regarding parked conversations. A computing system is a group of one or more computing devices.

In some embodiments, the initiating computing system 102, the answering computing system 104, the parking server 106, the target computing system 108, and the subscribed computing systems 110 perform the actions ascribed herein to these computing systems when processing systems in these computing systems execute software instructions. In some embodiments, the software instructions are stored on computer-readable data storage media. In such embodiments, the computer-readable data storage media can be part of computer software products. In other embodiments, these computing systems receive the software instructions via one or more communications media.

In various embodiments, the initiating user, the answering user, and the target user are various types of users. For example, in some embodiments, the initiating user, the answering user, and/or the target user are individual people. Furthermore, in some embodiments, the initiating user, the answering user, and/or the target user are automated systems that behave like individual people. For example, the answering user can be a voice menu system.

In various embodiments, the initiating computing system 102, the answering computing system 104, the parking server 106, the target computing system 108, and the subscribed computing systems 110 can comprise various types of computing devices. For example, the initiating computing system 102, the answering computing system 104, the parking server 106, the target computing system 108, and the subscribed computing systems 110 can comprise personal computers, laptop computers, netbooks, point-of-transaction computing devices, tablet computers, game consoles, handheld computers, computing devices integrated into vehicles, mobile telephones, network telephones, handheld game devices, smartphones, standalone server devices, blade server devices, intermediate network devices, and other types of computing devices.

The initiating computing system 102 is able to communicate electronically with the answering computing system 104, the parking server 106, and the target computing system 108. The answering computing system 104 is able to communicate electronically with at least the initiating computing system 102 and the parking server 106. The parking server 106 is able to communicate electronically with at least the initiating computing system 102, the answering computing system 104, and the target computing system 108. The target computing system 108 is able to communicate electronically with at least the initiating computing system 102 and the parking server 106. The subscribed computing systems 110 are able to communicate electronically with at least the parking server 106.

In various embodiments, the initiating computing system 102, the answering computing system 104, the parking server 106, the target computing system 108, and the subscribed computing systems 110 are able to communicate in various ways. For example, in some embodiments, the initiating computing system 102, the answering computing system 104, the parking server 106, the target computing system 108, and the subscribed computing systems 110 communicate using one or more electronic communication networks. An electronic communication network comprises a plurality of computing devices and links that facilitate communication among the plurality of computing devices. In various embodiments, the links include wired links and wireless links. For example, in some embodiments, the initiating computing system 102, the answering computing system 104, the parking server 106, the target computing system 108, and the subscribed computing systems 110 communicate using a local area network (LAN). In other embodiments, the initiating computing system 102, the answering computing system 104, the parking server 106, the target computing system 108, and the subscribed computing systems 110 communicate using a wide area network, such as the Internet.

The initiating user uses the initiating computing system 102 to initiate a conversation with the answering user. As used herein, a conversation is an interchange of information between two or more persons. People can enter and exit a conversation during the existence of the conversation. For example, a conversation can initially be between person "A" and person "B." In this example, person "C" can enter the conversation. After person "C" enters the conversation, person "B" can exit the conversation, leaving person "A" and person "C" in the conversation.

As used herein, a modality is a way in which the persons in a conversation exchange information. Example types of modalities include various types of voice conversations, various types of video conferencing, various types of network meetings, various types of instant messaging, various types of chat rooms, various types of application sharing, and other ways in which persons in a conversation can exchange information. The conversation between the initiating user and the answering user has one or more modalities. For example, the conversation can have a voice modality. In another example, the conversation can have an application sharing modality and an instant messaging modality.

To initiate the conversation, the initiating computing system 102 and the answering computing system 104 initiate a communication session to carry the conversation. A communication session is an interactive data exchange between two or more communicating computing systems that is established at a certain point in time and terminated at a later point in time. A communication session carries a conversation when computing systems use the communication session to exchange conversation data. The conversation data represents the information exchanged by the persons in the conversation.

To initiate the communication session, the initiating computing system 102 and the answering computing system 104 exchange messages that conform to a protocol. The protocol facilitates the initiation of communication sessions. A protocol is a set of rules governing the format of messages exchanged between computers. In some embodiments, the protocol is an extension to the Session Initiation Protocol (SIP). SIP is described in the Internet Engineering Task Force (IETF) RFC 3261, the entirety of which is hereby incorporated by reference.

In addition to facilitating the initiation of communication sessions, the protocol supports parking and unparking of conversations having a first modality and conversations having a second modality. In various embodiments, the protocol supports parking and unparking of conversations having various modalities. For example, in some embodiments, the protocol supports parking and unparking of conversations having a voice modality and supports parking and unparking of conversations having an instant messaging modality.

In some embodiments, the protocol specifies the information that computing systems exchange to initiate communication sessions to carry conversations having particular modalities. Such modalities are referred to herein as base modalities. For example, in some embodiments, the protocol specifies the information that computing systems exchange to initiate communication sessions that carry conversations having a voice modality.

Furthermore, the protocol is defined such that a software developer is able to extend the protocol so that computing systems are able to use the protocol to initiate communication sessions that carry conversations in supplemental modalities.

The supplemental modalities are modalities in addition to the base modalities. For example, the protocol may specify the information that computing systems exchange to initiate communication sessions that carry conversations having a voice modality, but not communication sessions that carry conversations having a video conferencing modality. In this example, the protocol is defined such that a software developer is able to extend the protocol so that computing systems are able to initiate communication sessions that carry conversations having the video conferencing modality.

After a communication session is established between the initiating computing system 102 and the answering computing system 104, the initiating computing system 102 and the answering computing system 104 use the communication session to exchange conversation data. The conversation data represents information in the conversation. At some point during the conversation, the answering user determines that the initiating user should communicate with the target user. For example, the initiating user could ask the answering user to speak with the answering user's supervisor. In this example, the answering user's supervisor could be the target user.

When the answering user determines that the initiating user should communicate with the target user, the answering user parks the conversation. When the conversation is parked, the conversation is suspended until the conversation is unparked. When the conversation is unparked, the conversation either resumes or terminates. In some embodiments, the initiating user parks the conversation instead of the answering user. In such embodiments, the initiating computing system 102 performs actions described herein as being performed by the answering computing system 104.

To park the conversation, the answering user instructs the answering computing system 104 to park the conversation. In response, the answering computing system 104 sends a park request to the parking server 106. The park request is a request to park the conversation. The park request conforms to the protocol.

Park requests include data needed to park and unpark conversations. In some instances, different data is needed to park and unpark conversations having different modalities. For example, in some embodiments, the protocol requires park requests to include a "dialog-info" tag when the park requests are requests to park conversations having a voice modality. The "dialog-info" tag includes a conversation identifier that identifies the conversation, an identifier of a computing system of the parker, and an identifier of a computing system of the parkee.

The protocol allows the park request to be extended to support parking of conversations that have supplemental modalities. For example, in some embodiments, the protocol does not require the park request to include any specific elements to park conversations having an instant messaging modality. In this example, the protocol allows the park request to be extended such that the park request includes information needed to park and unpark a conversation having the instant messaging modality.

The parking server 106 responds to the park request by using the protocol to initiate a second communication session. The second communication session is an interactive data exchange between the initiating computing system 102 and the parking server 106. The second communication session replaces the communication session between the initiating computing system 102 and the answering computing system 104. In some embodiments, the parking server 106 uses the second communication session to send data representing music to the initiating computing system 102. The music serves to inform the initiating user that the conversation is temporarily suspended.

In addition, the parking server 106 responds to the park request by sending an orbit to the answering computing system 104. The orbit is a set of data mapped to the conversation. A user can use the orbit to unpark the conversation. The protocol is extensible such that the orbit can be formatted in a variety of ways. For example, an orbit can be a sequence of digits. In another example, an orbit can identify the target user. For instance, an orbit can be an e-mail address of the target user. In yet another example, an orbit can be a Session Initiation Protocol (SIP) address of the target user. In yet another example, an orbit can be an instant messaging username of the target user. In yet another example, an orbit can identify a group of users (e.g., "accounting department").

Different types of orbit are appropriate for conversations having different modalities. For example, when the conversation has a telephone voice modality, a sequence of digits can be an appropriate orbit. In another example, when the conversation has an instant messaging modality, a username of a target user can be an appropriate orbit.

After the conversation is parked, the target user is paged. Paging a user comprises attempting to notify the user that the user is the target user of a currently parked conversation. In various embodiments, the target user is paged in various ways. For example, in some embodiments, the answering computing system 104 displays the orbit to the answering user. The answering user then uses a public address system to announce that a conversation is parked for the target user at the orbit, thereby paging the target user. For example, the answering user can use the public address system to announce "call waiting for Bob Smith on line eleven." In other embodiments, the answering computing system 104 pages the target user automatically. In yet other embodiments, the answering user asks another person to page the target user. In yet other embodiments, the parking server 106 pages the target user by sending an electronic message to a computing system used by the target user. For example, the parking server 106 can send an instant messaging message to the target computing system 108. In yet other embodiments, the parking server 106 sends a text message to a mobile telephone used by the target user. In yet other embodiments, the parking server 106 sends a message to a pager used by the target user.

When the target user receives the page, the target user uses the target computing system 108 to unpark the conversation. To unpark the conversation, the target computing system 108 sends an unpark request to the parking server 106. The unpark request specifies an orbit. When the orbit is mapped to the conversation, the parking server 106 sends referral information to the target computing system 108. The referral information enables the target computing system 108 to establish a communication session to carry the conversation.

The target computing system 108 and the initiating computing system 102 use messages that conform to the protocol to initiate a communication session between the initiating computing system 102 and the target computing system 108. This communication session replaces the communication session between the initiating computing system 102 and the parking server 106. After the initiating computing system 102 and the target computing system 108 establish this communication session, this communication session carries the conversation.

When the initiating computing system 102 and the target computing system 108 initiate the communication session, the target computing system 108 sends a notification message to the parking server 106. The notification message indicates that the initiating computing system 102 and the target computing system 108 have successfully established a communication session. After receiving the notification message from the target computing system 108, the parking server 106 sends an information message to the answering computing system 104. The information message indicates a reason why the conversation was unparked.

The subscribed computing systems 110 send subscription messages to the parking server 106. The subscription messages indicate to the parking server 106 that the subscribed computing systems 110 want to receive notification messages regarding parked conversations. In some embodiments, the initiating computing system 102, the answering computing system 104 and the target computing system 108 are subscribed computing systems. Consequently, the initiating computing system 102, the answering computing system 104 and the target computing system 108 can receive notification messages.

In various embodiments, the parking server 106 sends various types of notification messages to the subscribed computing systems 110 in response to various events. For example, in some embodiments, the parking server 106 sends park notification messages to the subscribed computing systems 110 when conversations are parked. A park notification message identifies a conversation and indicates that the conversation was parked. In addition, the parking server 106 sends unpark notification messages to the subscribed computing systems 110 when conversations are unparked. An unpark notification message identifies a conversation and indicates that the conversation was unparked.

Furthermore, in some embodiments, the parking server 106 receives a request to change an orbit mapped to a conversation. In response, the parking server 106 sends orbit change notification messages to the subscribed computing systems 110 when orbits of conversations change. An orbit of a conversation can be changed for a variety of reasons. For example, the orbit of a conversation initially identifies one user. However, in this example, the user fails to unpark the conversation within a given amount of time. In this example, the answering user changes the orbit to identify a different user.

In various embodiments, the notification messages include various types of information. For example, in various embodiments, a notification message regarding a conversation can indicate a start time of the conversation, a duration of the conversation, a number of times the conversation has been parked, an orbit of the conversation, an amount of time that the conversation has been parked, a textual note describing the conversation, a time remaining until a callback or fallback occurs for the conversation, an identifier for a party that parked that conversation, and/or other information.

In various embodiments, the subscribed computing systems 110 use the notification messages in various ways. For example, in some embodiments, the subscribed computing systems 110 display graphical user interfaces. When the subscribed computing systems 110 receive park notification messages, the subscribed computing systems 110 add new selectable controls associated with currently parked conversations to the graphical user interfaces. Furthermore, in some embodiments, the graphical user interfaces includes details regarding currently parked conversations, such as the orbits of the conversations, the amounts of time the conversations have been parked, textual notes regarding the conversations, and so on. When the parking server 106 unparks a conversation, the parking server 106 sends notification messages to each of the subscribed computing systems 110. In response to receiving the notification messages, the subscribed computing systems 110 remove the selectable controls associated with the conversation from the graphical user interfaces. In some embodiments, users of the subscribed computing systems 110 select ones of the selectable controls to unpark conversations associated with the selectable controls.

Furthermore, in some embodiments, conversation histories are maintained for users. A conversation history for a user is a set of entries containing information related to conversations in which the user has participated. In various embodiments, entries in the conversation histories specify various types of information related to conversations. For example, in various embodiments, entries in the conversation histories can specify start times and dates of conversations, end times and dates of conversations, durations of conversations, participants in conversations, information indicating modalities of conversations, information indicating whether conversations are currently parked, links to audio or video recordings of conversations, links to transcripts of conversations, information indicating users who initiated the conversations, information indicating whether users should follow up regarding conversations, links to textual notes regarding conversations, links to documents related to conversations, and other types of information related to conversations.

In various embodiments, various computing systems maintain the conversation histories for users. For example, in some embodiments, the parking server 106 maintains the conversation histories for users. In other embodiments, computing systems associated with individual users maintain conversation histories for respective ones of the users. In yet other embodiments, one or more computing systems in "the cloud" maintain conversation histories for users.

In various embodiments, users use the conversation histories in various ways. For example, in some embodiments, users use web browser applications to access web pages containing conversation histories. In other embodiments, users use the MICROSOFT® OUTLOOK® collaboration and communication client to view and interact with conversation histories.

In various embodiments, users are able to interact with conversation histories in various ways. For example, in some embodiments, a computing system displays a conversation history in a graphical user interface. Selectable controls are associated with each entry representing a currently parked conversation. In this example, a user unparks a currently parked conversation by selecting the selectable control associated with the currently parked conversation. Furthermore, in some embodiments where computing systems display conversation histories in graphical user interfaces, users are able to select selectable controls associated with entries to retrieve additional information regarding conversations.

Figure 2:
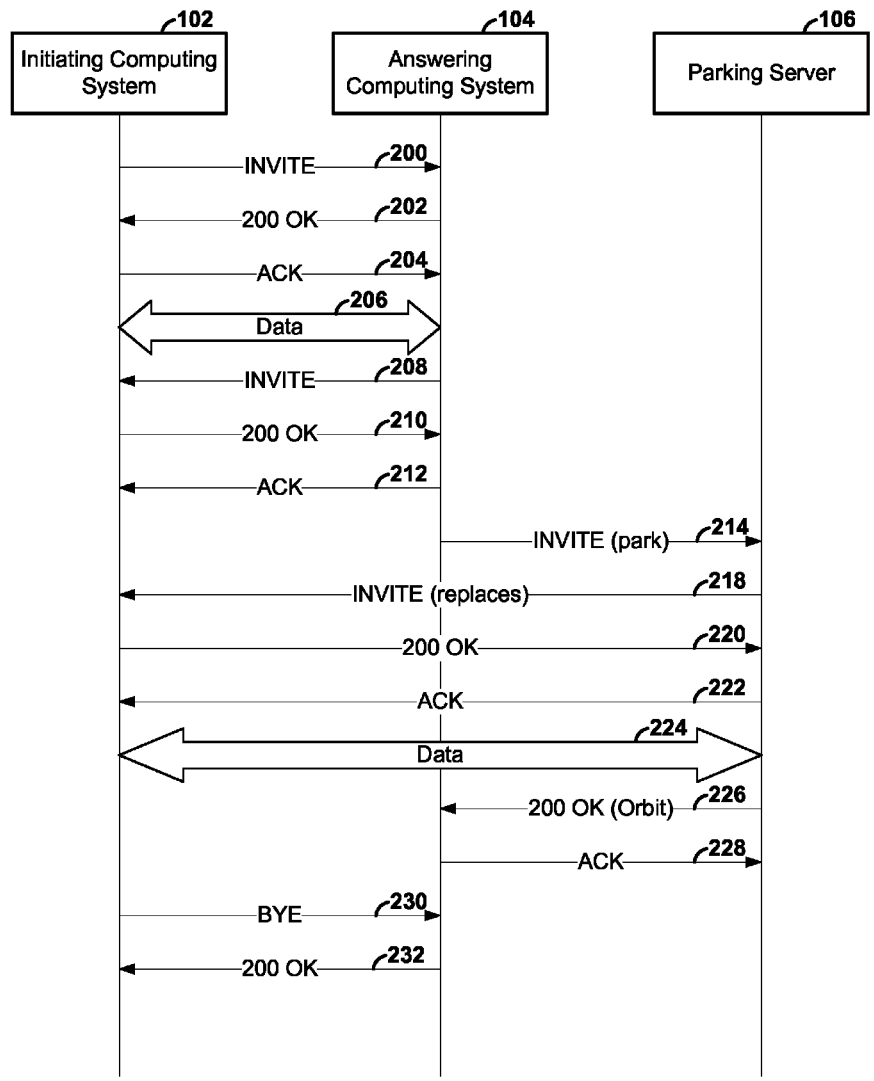
FIG. 2 is a communication diagram showing an example exchange of messages to park a conversation.

FIG. 2 is a communication diagram showing an example exchange of messages to park a conversation. It should be appreciated that the exchange of messages illustrated in FIG. 2 is merely one example. In other embodiments, different exchanges of messages are used to park a conversation. For example, in the example of FIG. 2, the messages conform to a protocol that extends SIP.

As illustrated in the example of FIG. 2, the initiating computing system 102 begins a process to initiate a communication session by sending an invitation message 200 to the answering computing system. The invitation message 200 is an invitation from the initiating computing system 102 to the answering computing system 104 to initiate a communication session with the answering computing system 104.

In response to the invitation message 200, the answering computing system 104 sends a "200 OK" message 202 to the initiating computing system 102. The "200 OK" message 202 indicates to the initiating computing system 102 that the answering computing system 104 has accepted the invitation to initiate a communication session with the initiating computing system 102. The initiating computing system 102 responds to the "200 OK" message 202 by sending an acknowledgment message 204 to the answering computing system 104. The acknowledgment message 204 indicates to the answering computing system 104 that the initiating computing system 102 has received the "200 OK" message 202. For ease of explanation, the communication session between the initiating computing system 102 and the answering computing system 104 is referred to herein as the first communication session.

Subsequently, the initiating computing system 102 and the answering computing system 104 exchange conversation data 206 in the first communication session. The conversation data 206 represents information exchanged in a conversation that initially includes the initiating user and the answering user. In various embodiments, the conversation data 206 conforms to various communication protocols. For example, in some embodiments, when the conversation has a voice modality or a video modality, the conversation data 206 conforms to the Real-time Transport Protocol (RTP) or the Secure Real-time Transport Protocol (SRTP). Furthermore, in some embodiments, when the conversation has an instant messaging modality, the conversation data 206 conforms to the Open System for Communication in Realtime (OSCAR) protocol, the Microsoft® Notification Protocol, the Extensible Messaging and Presence Protocol (XMPP), the Yahoo! Messenger Protocol, the Gadu-Gadu protocol, or another protocol that facilitates instant messaging. Furthermore, in some embodiments, when the conversation has a chat room modality, the conversation data 206 conforms to the Internet Relay Chat (IRC) protocol or another protocol that facilitates chat.

At some time after the initiating computing system 102 and the answering computing system 104 establish the first communication session, the answering computing system 104 sends an invitation message 208 to the initiating computing system 102. The invitation message 208 is an invitation to suspend the first communication session. In response to the invitation message 208, the initiating computing system 102 sends a "200 OK" message 210 to the answering computing system 104. The "200 OK" message 210 indicates to the answering computing system 104 that the initiating computing system 102 has accepted the invitation to suspend the first communication session. In response to receiving the "200 OK" message 210, the answering computing system 104 sends an acknowledgment message 212 to the initiating computing system 102.

Next, the answering computing system 104 sends an invitation message 214 to the parking server 106. The invitation message 214 is an invitation from the answering computing system 104 to the parking server 106 to establish a communication session between the answering computing system 104 and the parking server 106. In addition, the invitation message 214 comprises a park-request element. The park-request element is an extensible markup language (XML) element that represents a park request. In other words, the park-request element represents a request to park the conversation.

In various embodiments, the park-request element is formatted in various ways. For example, in some embodiments, the park-request element conforms to the following XML schema:

```
<xs:element name="park-request" type="tns:park-request-type"/>
<xs:complexType name="park-request-type">
    <xs:sequence>
        <xs:element name="audio" type="tns:modality-park-request-type"/>
        <xs:any namespace="##other" processContents="lax"/>
    </xs:sequence>
    <xs:attribute name="version" type="xs:string" use="required"/>
    <xs:attribute name="request-id" type="xs:string" use="required"/>
</xs:complexType>
<xs:complexType name="modality-park-request-type">
    <xs:sequence>
        <xs:element name="dialog-info" type="tns:dialog-info-type"/>
        <xs:element name="target" type="xs:anyURI"/>
    </xs:sequence>
</xs:complexType>
<xs:complexType name="dialog-info-type">
    <xs:sequence>
        <xs:element name="call-id" type="xs:string"/>
        <xs:element name="from-tag" type="xs:string"/>
        <xs:element name="to-tag" type="xs:string"/>
    </xs:sequence>
</xs:complexType>
```

In such embodiments, the park-request element has a "park-request-type" type. According to the XML schema, elements having the "park-request-type" type include a sequence of one or more elements. The sequence of one or more elements is allowed into include an "audio" element having the "modality-park-request-type" type.

In addition, the XML schema specifies that elements having the "park-request-type" type have a "version" attribute and a "request-id" attribute. The "version" attribute has a value that identifies a version of the schema. The "request-id" attribute has a value set by the answering computing system 104 and is included in messages passed back to the answering computing system 104 by the parking server 106. The answering computing system 104 uses the value of the "request-id" attribute to correlate the messages passed back to the answering computing system 104 by the parking server 106 with the invitation message 214.

The "audio" element specifies information needed to park a conversation that has an audio modality. According to the XML schema, elements having the "modality-park-request-type" type include a sequence of elements that include a "dialog-info" element having a "dialog-info-type" type and a "target" element having any type. The "target" element identifies the initiating user. When no target user unparks the conversation within a given time, the parking server 106 uses the information specified by the "target" element to send a call back to the answering user. When the answering user receives the call back, the answering user resumes the conversation with the initiating user.

According to the XML schema, elements having the "dialog-info-type" type include a sequence of elements that include a "call-id" element having a string type, a "from-tag" element having a string type, and a "to-tag" having a string type. Elements having a string type specify a string of characters. The "call-id" element specifies a conversation identifier for an audio call. The "call-id" element acts as a unique identifier to group together a series of messages. The "from-tag" specifies an identifier that identifies a computing system that initiated the audio call. The "to-tag" specifies an identifier that identifies a computing system that answered the audio call. IETF 3261 includes details regarding the "call-id" element, the "from-tag," and the "to-tag."

The XML schema also indicates that the sequence of elements in elements having the "park-request-type" type is allowed to include any set of zero or more XML elements. Because the sequence of elements in elements having the "park-request-type" type is allowed to include any set of zero or more XML elements, software developers are able to develop software that causes computing systems to generate and understand park-request elements that include elements that specify information needed to park and unpark conversations having modalities other than audio. In other words, the XML schema allows software developers to extend the park-request element such that the park-request elements can specify information needed to park and unpark conversations having modalities other than audio. For example, a software developer is able to develop software that causes computing systems to generate and understand park-request elements that specify information needed to park and unpark conversations having an instant messaging modality. In this example, the park-request elements can include an element that specifies a username of the initiating user, an element that specifies a username of the answering user, and an element that specifies a start time of the conversation. In another example, a software developer is able to develop software that causes computing systems to generate and understand park-request elements that include elements that specify information needed to park and unpark conversations having a video conferencing modality. In this example, the park-request elements can include an element that specifies an Internet Protocol (IP) address of the initiating computing system 102 and an element that specifies a port at the initiating computing system 102.

Furthermore, in some embodiments, the answering computing system 104 generates the invitation message 214 such that the park-request element includes one or more elements containing other information. For example, in some embodiments, the answering computing system 104 generates the invitation message 214 such that the park-request element includes an element that describes the conversation. In various embodiments, the park-request element includes one or more elements that describe various things about the conversation. For example, the park-request element can include one or more elements that describe the initiating user, a reason why the initiating user initiated the conversation, a target user, and other information about the conversation. Furthermore, in some embodiments, the answering user enters a textual note into the answering computing system 104. The textual note describes the conversation. For example, the textual note can indicate that the initiating user wants to talk about a given project. In such embodiments, the park-request element includes one or more elements that specify the textual note.

Furthermore, in some embodiments, the answering computing system 104 receives, from the answering user, data that identifies one or more target users or groups of users. The answering computing system 104 generates the invitation message 214 such that a park-request element that includes the data that identifies the one or more target users or groups of users. In such embodiments, the parking server 106 uses the data that identifies the one or more target users or groups of users to generate an orbit.

Furthermore, in some embodiments, the answering computing system 104 is able to generate the invitation message 214 such that the park-request element includes one or more elements that specify that the conversation is to have a different modality when the conversation is unparked. For example, the conversation may initially have a voice modality. In this example, the answering computing system 104 is able to generate the invitation message 214 such that the park-request element includes an element that specifies that the conversation is to have a video conferencing modality when the conversation is unparked.

Furthermore, in some embodiments, the answering computing system 104 is able to generate the invitation message 214 such that the invitation message 214 includes additional services information. The additional services information instructs the parking server 106 to provide one or more additional services to the initiating computing system 102 while the conversation is parked. For example, the additional services information can instruct the parking server 106 to provide access to a chat room while the conversation is parked. In another example, the additional services information can instruct the parking server 106 to stream a video to the initiating computing system 102 while the conversation is parked. In yet another example, the additional services information can instruct the parking server 106 to provide the initiating computing system 102 with access to a video game while the conversation is parked.

In one example where park-request element complies with the XML schema described above, the park-request element can appear as follows:

```
<park-request version="1.0" request-id="1">
    <audio>
        <dialog-info>
            <call-id>308efb5d986b43c582f34a6eb7ac0c99</call-id>
            <from-tag>46ab082cbc</from-tag>
            <to-tag>3e99ed6d56</to-tag>
        </dialog-info>
        <target-user>singh@contoso.com</target-user>
        <target>
            sip:alice@contoso.com;
            opaque=user:epid:ZEPY4j5IbFG4be7xFQPLYQAA;gruu
        </target>
    </audio>
</park-request>
```

In this example, the conversation has an audio modality. Furthermore, "308efb5d986b43c582f34a6eb7ac0c99" is an identifier that identifies a conversation, "46ab082cbc" is an identifier that identifies an initiating computing system (i.e., the initiating computing system 102), and "3e99ed6d56" is an identifier that identifies an answering computing system (i.e., the answering computing system 104). "singh@contoso.com" identifies the target user. "sip:alice@contoso.com;opaque=user:epid:ZEPY4j5IbFG4be7xFQPLYQAA;gruu" is a string that identifies the initiating user.

Furthermore, in this example, the "version" attribute specifies the value "1.0". Over time, the schema might change. New version numbers are assigned to new versions of the schema. The value of the "version" attribute indicates to the parking server 106 a version of the schema in which the park-request element is formatted. In this example, the "version" attribute indicates to the parking server 106 that the park-request element is formatted according to version 1.0 of the schema.

Furthermore, in this example, the "request-id" attribute specifies the value "1". The parking server 106 uses the value "1" in the "request-id" attribute of the park-request element to identify, in other messages, elements corresponding to the park-request element. In some embodiments, the answering computing system 104 increments the value specified by the "request-id" attribute each time the answering computing system 104 sends an invitation message to the parking server 106.

In response to receiving the invitation message 214, the parking server 106 sends an invitation message 218 to the initiating computing system 102. The invitation message 218 is an invitation to the initiating computing system 102 to replace the first communication session with a second communication session. The second communication session is a communication session between the initiating computing system 102 and the parking server 106.

In response to receiving the invitation message 218, the initiating computing system 102 sends a "200 OK" message 220 to the parking server 106. The "200 OK" message 220 indicates that the initiating computing system 102 accepts the invitation to replace the first communication session with the second communication session. Upon receiving the "200 OK" message 220 from the initiating computing system 102, the parking server 106 sends an acknowledgment message 222 to the initiating computing system 102. The acknowledgment message 222 acknowledges the "200 OK" message 220.

The parking server 106 and the initiating computing system 102 exchange data 224 using the second communication session. In various embodiments, the data 224 represents various types of information. For example, in some embodiments, the parking server 106 uses the second communication session to send to the initiating computing system 102 data that represents music. In other embodiments, the data 224 represents images or video. For example, in such embodiments, the data 224 can represent a landscape, a corporate logo, or an advertisement. In this way, the initiating user is able to view the images or video while the initiating user is waiting for the target user to unpark the conversation. Furthermore, in other embodiments, the data 224 represents a chat session. In such embodiments, the initiating user is able to chat with one or more real users or virtual users while the initiating user is waiting for the target user to unpark the conversation. In some embodiments, the type of information exchanged in the data 224 is dependent on the additional service information included in the invitation message 214.

After the second communication session is established, the parking server 106 sends a "200 OK" message 226 to the answering computing system 104. The "200 OK" message 226 indicates that the parking server 106 accepts the invitation to establish a communication session between the answering computing system 104 and the parking server 106. In addition, the "200 OK" message 226 comprises a park response. The park response comprises an orbit of the conversation. In response to receiving the "200 OK" message 226, the answering computing system 104 sends an acknowledgment message 228 to the parking server 106.

In various embodiments, the "200 OK" message 226 is formatted in various ways. For example, in some embodiments, the "200 OK" message 226 includes a park-response element. The park-response element is an XML element that represents a park response. In some such embodiments, the park-response element conforms to the following XML schema:

```
<xs:element name="park-response" type="tns:park-response-type"/>
<xs:complexType name="park-response-type">
    <xs:sequence>
        <xs:element name="orbit" type="xs:string"/>
        <xs:element name="ms-parked-call" type="xs:string"/>
    </xs:sequence>
    <xs:attribute name="version" type="xs:string" use="required"/>
    <xs:attribute name="request-id" type="xs:string" use="required"/>
</xs:complexType>
```

In such embodiments, the park-response element has a "park-response-type" type. According to the XML schema, elements having the "park-response-type" type include a sequence of one or more elements.

The sequence of one or more elements is allowed to include an "orbit" element having a string type. The "orbit" element specifies an orbit. In various embodiments, the orbit is formatted in various ways. For example, in some embodiments, the orbit is a sequence of digits (e.g., "1234"). Furthermore, in some embodiments, the orbit identifies a target user. In various embodiments, the orbit identifies the target user in various ways. For example, the orbit can identify the target user by specifying a name of the target user, an e-mail address of the target user, a user name of the target user, a SIP address of the target user, or another type of data that identifies the target user. For example, the initiating user may want to talk to "Cathy Jones." In this example, the value of the orbit can be "Cathy Jones." Furthermore, in some embodiments, the orbit identifies a group of users as target users. For example, the initiating user may want to talk to someone in the electronics department of a store. In this example, the orbit can specify "electronics department."

In addition, the sequence of elements is allowed to include an "ms-parked-call" element having a string type. The "ms-parked-call" element specifies a conversation identifier. The conversation identifier uniquely identifies the communication session between the initiating computing system 102 and the parking server 106. In some embodiments, the computing systems use the conversation identifier to unpark the conversation. Furthermore, in some embodiments, computing systems use the conversation identifier to retrieve data about the conversation from the parking server 106. For example, in some embodiments, the invitation message 214 includes data describing the conversation. In this example, the parking server 106 stores the data describing the conversation. Computing systems send requests (not shown) to the parking server 106 to retrieve the data describing the conversation. The requests specify the conversation identifier. In this example, the computing systems display the data describing the conversation. Based on the data describing the conversation, users of the computing systems are able to decide whether to unpark the conversation.

In addition, the XML schema specifies that elements having the "park-response-type" type have a "version" attribute having a string type and a "request-id" attribute having a string type. The "version" attribute has a value that identifies a version of the schema. The "request-id" attribute has a value initially set by the answering computing system 104 and included the "request-id" attribute of the invitation message 214. The answering computing system 104 uses the value of the "request-id" attribute to correlate the park-response element in the "200 OK" message 226 with the park-request element in the invitation message 214.

In one example where the park-response element complies with the XML schema described above, the park-response element may appear as follows:

```
<park-response version="1.0" request-id="1">
    <orbit>12345</orbit>
    <ms-parked-call>86d1279984aa4ffcaf29e1f5dae119f5;from-tag=4e40e6d3b0;to-tag=c1f835afed</ms-parked-call>
</park-response>
```

In this example, the "orbit" element specifies that the orbit is "12345." Furthermore, in this example, the "ms-parked-call" element specifies the following conversation identifier: "86d1279984aa4ffcaf29e1f5dae119f5;from-tag=4e40e6d3b0;to-tag=c1f835afed". In this example, the conversation identifier is a concatenation of a "call-id" element that identifies a conversation, a "from-tag" that identifies the parking server 106, and a "to-tag" that identifies the initiating computing system 102.

In this example, the version attribute of the park-response element indicates that the park-response element conforms to version 1.0 of the XML schema. Furthermore, in this example, the "request-id" attribute indicates that the park-response element corresponds to a park-request element having a "request-id" attribute that specifies the value "1".

In various embodiments, the answering computing system 104 can perform a variety of actions in response to receiving the "200 OK" message 226 in addition to sending the acknowledgment message 228. For example, in some embodiments, the answering computing system 104 displays the orbit to a user of the answering computing system 104. In other embodiments, the answering computing system 104 outputs an audible vocalization of the orbit to the user of the answering computing system 104. In yet other embodiments, the answering computing system 104 automatically outputs an announcement of the orbit on a public address system.

Furthermore, after the second communication session is established, the initiating computing system 102 sends a bye message 230 to the answering computing system 104. The bye message 230 indicates that the initiating computing system 102 wants to terminate the first communication session (i.e., the communication session between the initiating computing system 102 and the answering computing system 104). In response to receiving the bye message 230, the answering computing system 104 sends a "200 OK" message 232 to the initiating computing system. The "200 OK" message 232 indicates that the answering computing system 104 complies with the request of the initiating computing system 102 to terminate the first communication session. In this way, the first communication session is replaced by the second communication session.

Figure 3:
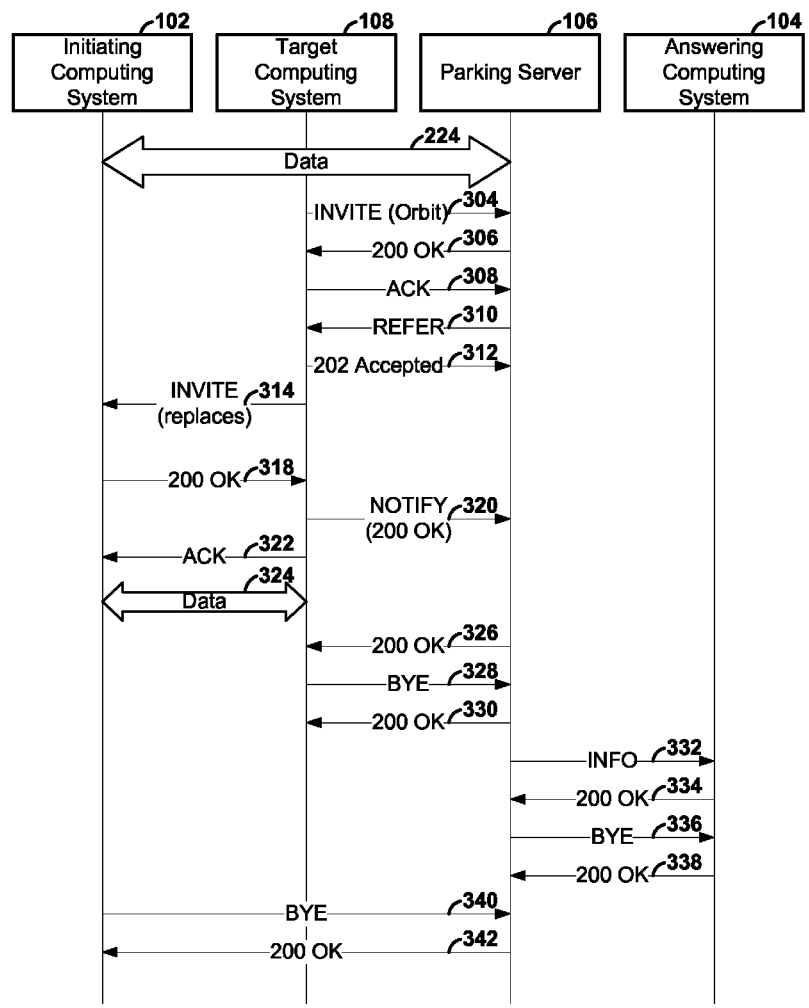
FIG. 3 is a communication diagram showing an example exchange of messages to unpark a conversation.

FIG. 3 is a communication diagram showing an example exchange of messages to unpark a conversation. It should be appreciated that the exchange of messages illustrated in FIG. 3 is merely one example. In other embodiments, different exchanges of messages are used to unpark a conversation. For example, in the example of FIG. 3, each of the messages conforms to the Session Initiation Protocol (SIP). In other embodiments, messages conforming to other protocols are exchanged to park conversations.

As illustrated in the example of FIG. 3, the parking server 106 sends data 224 to the initiating computing system 102 via the second communication session (i.e., the communication session between the initiating computing system 102 and the parking server 106).

To unpark the conversation, the target computing system 108 sends an invitation message 304 to the parking server 106. The invitation message 304 is an invitation from the target computing system 108 to the parking server 106 to establish a communication session between the target computing system 108 and the parking server 106. In addition, the invitation message comprises an unpark request. The unpark request is a request by the target computing system 108 to unpark the conversation. The unpark request includes data that identifies the conversation. For example, the unpark request can specify the orbit of the conversation or the conversation identifier of the conversation.

In various embodiments, the target computing system 108 sends the invitation message 304 to the parking server 106 in response to various events. For example, in some embodiments, the target computing system 108 is a network telephone and the orbit is a sequence of digits. In such embodiments, the target computing system 108 sends the invitation message 304 when a user of the target computing system 108 dials the sequence of digits.

Furthermore, in some embodiments, the target computing system 108 displays a graphical user interface containing separate selectable controls for parked conversations on the parking server 106. In some embodiments, the selectable controls specify the orbit of the parked conversations associated with the selectable controls. The target computing system 108 sends the invitation message 304 to the parking server 106 in response to receiving a selection of one of the selectable controls.

In response to receiving the invitation message 304, the parking server 106 determines whether the orbit identifier specified in the invitation message 304 is mapped to a conversation. When the parking server 106 determines that the orbit identifier is mapped to a conversation, the parking server 106 sends a "200 OK" message 306 to the target computing system 108. The "200 OK" message 306 indicates that the parking server 106 accepts the request by the target computing system 108 to establish a communication session between the target computing system 108 and the parking server 106. In addition, the "200 OK" message 306 indicates that the parking server 106 accepts the request to unpark the conversation. In response to receiving the "200 OK" message 306, the target computing system 108 sends an acknowledgment message 308 to the parking server 106. The acknowledgment message 308 indicates to the parking server 106 that the target computing system 108 acknowledges the "200 OK" message 306.

In some embodiments, the parking server 106 only allows authorized users to unpark parked conversations. In such embodiments, the target computing system 108 sends one or more security credentials to the parking server 106. In various embodiments, the target computing system 108 sends the one or more security credentials to the parking server 106 in various ways. For example, in some embodiments, the invitation message 304 includes the one or more security credentials. In other embodiments, the target computing system 108 sends the one or more security credentials to the parking server 106 in one or more separate messages. In various embodiments, the security credentials are formatted in various ways. For example, in some embodiments, the security credentials are formatted as an information card that includes digitally signed claims regarding the identity of the user of the target computing system 108. Furthermore, in other embodiments, the security credentials are formatted as a username and password.

In embodiments where the parking server 106 only allows authorized users to unpark parked conversations, the parking server 106 evaluates the security credentials to determine whether the user of the target computing system 108 is authorized to unpark parked conversations. In the example of FIG. 3, if the user of the target computing system 108 is not authorized to unpark the conversation, the parking server 106 does not send the "200 OK" message 306. Rather, the parking server 106 sends an error message to the target computing system 108. On the other hand, if the user of the target computing system 108 is authorized to unpark the conversation, the parking server 106 sends the "200 OK" message 306.

Although not illustrated in the example of FIG. 3 for the sake of clarity, the parking server 106 can send other messages to the target computing system 108 in response to the invitation message 304. For example, in some embodiments, the parking server 106 sends an error message to the target computing system 108 when the invitation message 304 specifies an orbit that is not mapped to a conversation.

The parking server 106 then sends a refer message 310 to the target computing system 108. The refer message 310 is a request by the parking server 106 to refer the target computing system 108 to the initiating computing system 102. The refer message 310 includes referral information. The referral information enables the target computing system 108 to establish a communication session that is between the target computing system 108 and the initiating computing system 102 and that carries the conversation. For example, in some embodiments, the referral information includes an identifier that identifies the initiating computing system 102 and includes a conversation identifier. The conversation identifier identifies the conversation. In such embodiments, the conversation identifier included in the referral information is the same as a conversation identifier included in the park request.

In response to receiving the refer message 310, the target computing system 108 sends a "202 Accepted" message 312 to the parking server 106. The "202 Accepted" message indicates to the parking server 106 that the target computing system 108 has accepted the request by the parking server 106 to refer the target computing system 108 to the initiating computing system 102.

Subsequently, the target computing system 108 sends an invitation message 314 to the initiating computing system 102. The invitation message 314 is an invitation by the target computing system 108 to the initiating computing system 102 to replace the second communication session with a third communication session. The third communication session is a communication session between the initiating computing system 102 and the target computing system 108. In some embodiments, the invitation message 314 specifies a conversation identifier specified in the referral information. Because the initiating computing system 102 associates the conversation identifier with the conversation, the initiating computing system 102 is able to determine that the invitation message 314 is a request to replace the second communication session.

In response to receiving the invitation message 314, the initiating computing system 102 sends a "200 OK" message 318 to the target computing system 108. The "200 OK" message 318 indicates to the target computing system 108 that the initiating computing system 102 accepts the invitation by the target computing system 108 to replace the second communication session with the third communication session.

In response to receiving the "200 OK" message 318, the target computing system 108 sends a notification message 320 to the parking server 106. The notification message 320 is a "200 OK" type message. The notification message 320 indicates to the parking server 106 that the initiating computing system 102 has accepted the invitation to replace the second communication session with the third communication session.

If an error occurs and the initiating computing system 102 does not send the "200 OK" message 318 to the target computing system 108, the target computing system 108 sends an error message (not shown) to the parking server 106. The error message indicates to the parking server 106 that the target computing system 108 was unable to establish a communication session with the initiating computing system 102. Furthermore, in some embodiments, the error message indicates a reason why the target computing system 108 was unable to establish a communication session with the initiating computing system 102. For example, in some embodiments, the error message can indicate that a network error occurred and the target computing system 108 was unable to communicate with the initiating computing system 102. In another example, the error message can indicate that the target computing system 108 was able to communicate with the initiating computing system 102, but that the configuration settings of the initiating computing system 102 are incompatible with the configuration settings of the target computing system 108.

Furthermore, in response to receiving the "200 OK" message 318 from the initiating computing system 102, the target computing system 108 sends an acknowledgment message 322 to the initiating computing system 102. After the target computing system 108 sends the acknowledgment message 322 to the initiating computing system 102, the third communication session is established. The initiating computing system 102 and the target computing system 108 are then able to exchange conversation data 324 via the third communication session. The conversation data 324 represents information in the conversation.

When the parking server 106 receives the notification message 320 from the target computing system 108, the parking server 106 sends a "200 OK" message 326 to the target computing system 108. The "200 OK" message 326 indicates to the target computing system 108 that the parking server 106 acknowledges the notification message 320. After the target computing system 108 receives the "200 OK" message 326, the target computing system 108 sends a bye message 328 to the parking server 106. The bye message 328 indicates to the parking server 106 that the target computing system 108 wants to terminate the communication session between the target computing system 108 and the parking server 106. In response to receiving the bye message 328, the parking server 106 sends a "200 OK" message 330 to the target computing system 108. The "200 OK" message 330 indicates to the target computing system 108 that the parking server 106 acknowledges the request by the target computing system 108 to terminate the communication session between the target computing system 108 and the parking server 106.

After the parking server 106 sends the "200 OK" message 330 to the target computing system 108, the parking server 106 sends an information message 332 to the answering computing system 104. The information message 332 indicates to the answering computing system 104 that the conversation has been unparked. Furthermore, in some embodiments, the information message 332 specifies a reason why the conversation was unparked.

In various embodiments, the information message 332 is formatted in various ways. For example, in some embodiments, the information message 332 includes an unpark-notification element. The unpark-notification element is an XML element that specifies a reason why a conversation was unparked. In some embodiments, the unpark-notification element conforms to the following XML schema:

```
<xs:element name="unpark-notification"
    type="tns:unpark-notification-type"/>
<xs:complexType name="unpark-notification-type">
  <xs:sequence>
    <xs:element name="reason" type="tns:unpark-reason-type"/>
    <xs:element name="target" type="xs:anyURI" minOccurs="0"/>
  </xs:sequence>
  <xs:attribute name="version" type="xs:string" use="required"/>
  <xs:attribute name="request-id" type="xs:string" use="required"/>
</xs:complexType>
<xs:simpleType name="unpark-reason-type">
  <xs:restriction base="xs:string">
    <xs:enumeration value="retrieval"/>
    <xs:enumeration value="hang-up"/>
    <xs:enumeration value="ringback"/>
    <xs:enumeration value="fallback"/>
    <xs:enumeration value="drop"/>
  </xs:restriction>
</xs:simpleType>
```

In such embodiments, the unpark-notification element has an "unpark-notification-type" type. According to the XML schema, elements having the "unpark-notification-type" type include a sequence of elements. The sequence of elements includes a "reason" element having an "unpark-reason-type" type. In addition, the sequence of elements is allowed to include a "target" element having an "anyURI" type. The "target" element specifies a URI that identifies the target user.

In addition, the XML schema specifies that elements having the "unpark-notification-type" type have a "version" attribute having a string type and a "request-id" attribute having a string type. The "version" attribute has a value that identifies a version of the schema. The "request-id" attribute has a value initially set by the answering computing system 104 and included the "request-id" attribute of the invitation message 214. The answering computing system 104 uses the value of the "request-id" attribute to correlate the unpark-notification element in the information message 332 with the park-request element in the invitation message 214.

Furthermore, this XML schema specifies that elements having the "unpark-reason-type" are only allowed to specify one of the following values: "retrieval," "hang-up," "ringback," "fallback," and "drop." These values indicate reasons why the conversation was unparked. For example, the "retrieval" value indicates that the conversation was unparked because the conversation was successfully unparked by another computing system. The "hang-up" value indicates that the conversation was unparked because the initiating computing system 102 hung up (i.e., unilaterally terminated) the conversation. The "ringback" value indicates that the conversation was unparked because no computing system unparked the conversation within a given period of time and the conversation has been automatically transferred back to a user who parked the conversation. The "fallback" value indicates that no computing system has unparked the conversation after a given period of time and that the conversation has been automatically transferred to a fallback computing system. In some instances, the fallback computing system is a computing system used by a receptionist. The "drop" value indicates that the conversation was unintentionally dropped.

In one example where the unpark-notification element complies with the XML schema described above, the unpark-notification element can appear as follows:

```
<unpark-notification version="1.0" request-id="1">
    <reason>retrieval</reason>
    <target>sip:carol@contoso.com</target>
</unpark-notification>
```

In this example, the unpark-notification element has a "version" attribute that specifies the value "1.0." In addition, the unpark-notification element has a "request-id" element that specifies the value "1." Furthermore, in this example, the unpark-notification element includes a "reason" element. In this example, the "reason" specifies "retrieval" as the reason why the conversation was unparked.

Furthermore, in this example, the unpark-notification element includes a "target" element that identifies the target user. In this example, the "target" element indicates that "carol@contoso.com" is the target user (i.e., the user who unparked the conversation).

In addition, the "version" attribute of the unpark-notification element indicates that the unpark-notification element conforms to version "1.0" of the XML schema. The "request-id" attribute of the unpark-notification element indicates that the unpark-notification element corresponds to a park-request element having a "request-id" attribute that specifies the value "1".

In various embodiments, the answering computing system 104 performs various actions in response to receiving the information message 332. For example, some embodiments of the answering computing system 104 perform different actions when the "reason" element has different values. For example, the answering computing system 104 can display a list of parked conversations to a user of the answering computing system 104. The answering computing system 104 automatically removes the conversation from the list of parked conversations when the "reason" element indicates "retrieval," "hang-up," "fallback," or "drop." Furthermore, when the "reason" element indicates "ringback," the answering computing system 104 attempts to get the answering user to unpark the conversation. For example, the answering computing system 104 could generate a telephone ring sound. In various embodiments, the answering user is able to perform a variety of actions when the answering user unparks the conversation. For example, in some embodiments, the answering user parks the conversation again with an orbit that identifies a different target user.

In response to receiving the information message 332, the answering computing system 104 sends a "200 OK" message 334 to the parking server 106. The "200 OK" message 334 indicates to the parking server 106 that the answering computing system 104 acknowledges the information message 332.

In response to receiving the "200 OK" message 334, the parking server 106 sends a bye message 336 to the answering computing system 104. The bye message 336 indicates that the parking server 106 wants to terminate the communication session between the parking server 106 and the answering computing system 104. In response to receiving the bye message 336, the answering computing system 104 sends a "200 OK" message 338 to the parking server 106. The "200 OK" message 338 indicates to the parking server 106 that the answering computing system 104 complies with the request by the parking server 106 to terminate the communication session between the parking server 106 and the answering computing system 104.

After the third communication session is established (i.e., the communication session between the initiating computing system 102 and the target computing system 108), the initiating computing system 102 sends a bye message 340 to the parking server 106. The bye message 340 indicates to the parking server 106 a request by the initiating computing system 102 to terminate the second communication session (i.e., the communication session between the initiating computing system 102 and the parking server 106). In response to receiving the bye message 340, the parking server 106 sends a "200 OK" message 342 to the initiating computing system 102. The "200 OK" message 342 indicates to the initiating computing system 102 that the parking server 106 complies with the request to terminate the second communication session.

Figure 4:
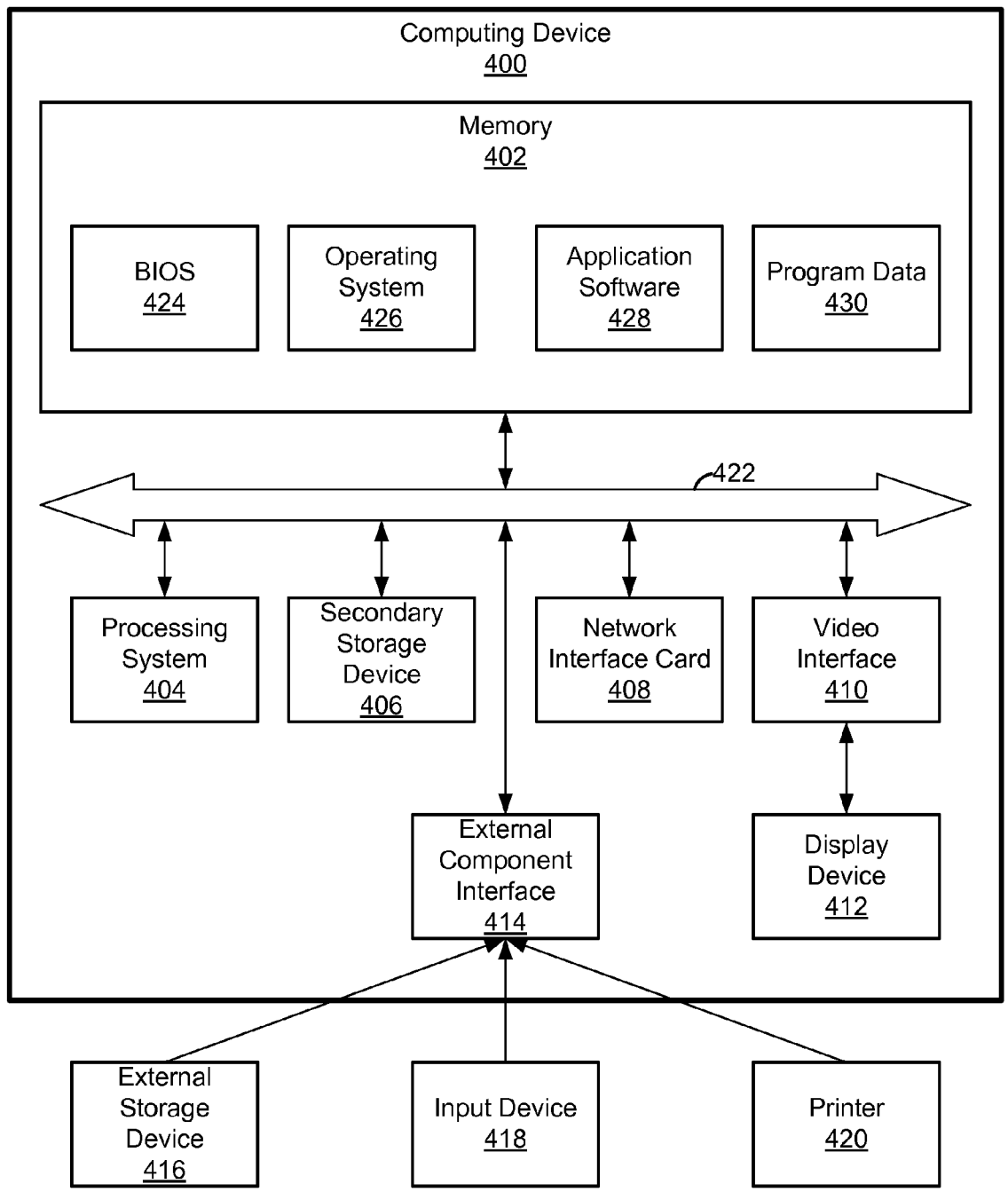
FIG. 4 is a block diagram illustrating an example computing device usable in the system.

FIG. 4 is a block diagram illustrating an example computing device 400 usable in the system 100. In some embodiments, the initiating computing system 102, the answering computing system 104, the parking server 106, the target computing system 108 and the subscribed computing systems 110 are implemented using one or more computing devices like the computing device 400. It should be appreciated that in other embodiments, the initiating computing system 102, the answering computing system 104, the parking server 106, the target computing system 108 and the subscribed computing systems 110 are implemented using computing devices having hardware components other than those illustrated in the example of FIG. 4.

In different embodiments, computing devices are implemented in different ways. For instance, in the example of FIG. 4, the computing device 400 comprises a memory 402, a processing system 404, a secondary storage device 406, a network interface card 408, a video interface 410, a display device 412, an external component interface 414, an external storage device 416, an input device 418, a printer 420, and a communication medium 422. In other embodiments, computing devices are implemented using more or fewer hardware components. For instance, in another example embodiment, a computing device does not include a video interface, a display device, an external storage device, or an input device.

The memory 402 includes one or more computer-readable data storage media capable of storing data and/or instructions. In different embodiments, the memory 402 is implemented in different ways. For instance, in various embodiments, the memory 402 is implemented using various types of computer-readable data storage media. Example types of computer-readable data storage media include, but are not limited to, dynamic random access memory (DRAM), double data rate synchronous dynamic random access memory (DDR SDRAM), reduced latency DRAM, DDR2 SDRAM, DDR3 SDRAM, Rambus RAM, solid state memory, flash memory, read-only memory (ROM), electrically-erasable programmable ROM, and other types of devices and/or articles of manufacture that store data.

The processing system 404 includes one or more physical integrated circuits that selectively execute software instructions. In various embodiments, the processing system 404 is implemented in various ways. For instance, in one example embodiment, the processing system 404 is implemented as one or more processing cores. For instance, in this example embodiment, the processing system 404 may be implemented as one or more Intel Core 2 microprocessors. In another example embodiment, the processing system 404 is implemented as one or more separate microprocessors. In yet another example embodiment, the processing system 404 is implemented as an ASIC that provides specific functionality. In yet another example embodiment, the processing system 404 provides specific functionality by using an ASIC and by executing software instructions.

In different embodiments, the processing system 404 executes software instructions in different instruction sets. For instance, in various embodiments, the processing system 404 executes software instructions in instruction sets such as the x86 instruction set, the POWER instruction set, a RISC instruction set, the SPARC instruction set, the IA-64 instruction set, the MIPS instruction set, and/or other instruction sets.

The secondary storage device 406 includes one or more computer-readable data storage media. The secondary storage device 406 stores data and software instructions not directly accessible by the processing system 404. In other words, the processing system 404 performs an I/O operation to retrieve data and/or software instructions from the secondary storage device 406. In various embodiments, the secondary storage device 406 is implemented by various types of computer-readable data storage media. For instance, the secondary storage device 406 may be implemented by one or more magnetic disks, magnetic tape drives, CD-ROM discs, DVD-ROM discs, Blu-Ray discs, solid state memory devices, Bernoulli cartridges, and/or other types of computer-readable data storage media. In some embodiments, computer program products include such computer-readable data storage media.

The network interface card 408 enables the computing device 400 to send data to and receive data from a computer communication network. In different embodiments, the network interface card 408 is implemented in different ways. For example, in various embodiments, the network interface card 408 is implemented as an Ethernet interface, a token-ring network interface, a fiber optic network interface, a wireless network interface (e.g., WiFi, WiMax, etc.), or another type of network interface.

The video interface 410 enables the computing device 400 to output video information to the display device 412. In different embodiments, the video interface 410 is implemented in different ways. For instance, in one example embodiment, the video interface 410 is integrated into a motherboard of the computing device 400. In another example embodiment, the video interface 410 is a video expansion card. Example types of video expansion cards include Radeon graphics cards manufactured by ATI Technologies, Inc. of Markham, Ontario, Geforce graphics cards manufactured by Nvidia Corporation of Santa Clara, Calif., and other types of graphics cards.

In various embodiments, the display device 412 is implemented as various types of display devices. Example types of display devices include, but are not limited to, cathode-ray tube displays, LCD display panels, plasma screen display panels, touch-sensitive display panels, LED screens, projectors, and other types of display devices. In various embodiments, the video interface 410 communicates with the display device 412 in various ways. For instance, in various embodiments, the video interface 410 communicates with the display device 412 via a Universal Serial Bus (USB) connector, a VGA connector, a digital visual interface (DVI) connector, an S-Video connector, a High-Definition Multimedia Interface (HDMI) interface, a DisplayPort connector, or other types of connectors.

The external component interface 414 enables the computing device 400 to communicate with external devices. In various embodiments, the external component interface 414 is implemented in different ways. For instance, in one example embodiment, the external component interface 414 is a USB interface. In other example embodiments, the computing device 400 is a FireWire interface, a serial port interface, a parallel port interface, a PS/2 interface, and/or another type of interface that enables the computing device 400 to communicate with external components.

In different embodiments, the external component interface 414 enables the computing device 400 to communicate with different external components. For instance, in the example of FIG. 4, the external component interface 414 enables the computing device 400 to communicate with the external storage device 416, the input device 418, and the printer 420. In other embodiments, the external component interface 414 enables the computing device 400 to communicate with more or fewer external components. Other example types of external components include, but are not limited to, speakers, phone charging jacks, modems, media player docks, other computing devices, scanners, digital cameras, a fingerprint reader, and other devices that can be connected to the computing device 400.

The external storage device 416 is an external component comprising one or more computer readable data storage media. Different implementations of the computing device 400 interface with different types of external storage devices. Example types of external storage devices include, but are not limited to, magnetic tape drives, flash memory modules, magnetic disk drives, optical disc drives, flash memory units, zip disk drives, optical jukeboxes, and other types of devices comprising one or more computer-readable data storage media. The input device 418 is an external component that provides user input to the computing device 400. Different implementations of the computing device 400 interface with different types of input devices. Example types of input devices include, but are not limited to, keyboards, mice, trackballs, stylus input devices, key pads, microphones, joysticks, touch-sensitive display screens, and other types of devices that provide user input to the computing device 400. The printer 420 is an external device that prints data to paper. Different implementations of the computing device 400 interface with different types of printers. Example types of printers include, but are not limited to laser printers, ink jet printers, photo printers, copy machines, fax machines, receipt printers, dot matrix printers, or other types of devices that print data to paper.

The communications medium 422 facilitates communication among the hardware components of the computing device 400. In different embodiments, the communications medium 422 facilitates communication among different components of the computing device 400. For instance, in the example of FIG. 4, the communications medium 422 facilitates communication among the memory 402, the processing system 404, the secondary storage device 406, the network interface card 408, the video interface 410, and the external component interface 414. In different implementations of the computing device 400, the communications medium 422 is implemented in different ways. For instance, in different implementations of the computing device 400, the communications medium 422 may be implemented as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 402 stores various types of data and/or software instructions. For instance, in the example of FIG. 4, the memory 402 stores a Basic Input/Output System (BIOS) 424, an operating system 426, application software 428, and program data 430. The BIOS 424 includes a set of software instructions that, when executed by the processing system 404, cause the computing device 400 to boot up. The operating system 426 includes a set of software instructions that, when executed by the processing system 404, cause the computing device 400 to provide an operating system that coordinates the activities and sharing of resources of the computing device 400. Example types of operating systems include, but are not limited to, MICROSOFT® WINDOWS®, Linux, Unix, Apple OS X, Apple OS X iPhone, Palm webOS, Palm OS, Google Chrome OS, Google Android OS, and so on. The application software 428 includes a set of software instructions that, when executed by the processing system 404, cause the computing device 400 to provide applications to a user of the computing device 400. The program data 430 is data generated and/or used by the application software 428. In some embodiments, the memory 402 or another computer-readable data storage medium in or attached to the computing device 400 stores software instructions that, when executed by the processing system 404, cause the computing device 400 to perform the actions of computing devices described above.

The various embodiments described above are provided by way of illustration only and should not be construed as limiting. Those skilled in the art will readily recognize various modifications and changes that may be made without following the example embodiments and applications illustrated and described herein.

We claim:

1. A method comprising:
   receiving, by a parking server, a park request from a first computing system, the park request being a request to park a conversation between the first computing system and a second computing system, the park request conforming to a protocol that supports parking and unparking of conversations having a first modality and conversations having a second modality that is different from the first modality;
   receiving, by the parking server, an unpark request from a third computing system that is different from the first computing system and the second computing system, the unpark request being a request to unpark the conversation, wherein the third computing system is a target computing system for the conversation; and
   sending, by the parking server, referral information to the third computing system, the referral information enabling the third computing system to establish a communication session to carry the conversation.

2. The method of claim 1, wherein the method further comprises:
   receiving an invitation message that includes the park request, the invitation message being an invitation from the first computing system to establish a communication session with the parking server.

3. The method of claim 1, wherein the conversation has a plurality of modalities.

4. The method of claim 1, wherein the park request conforms to an XML schema that specifies a format for a park-request element, the park-request element being an XML element that represents the park request;
   wherein the park-request element includes one or more XML elements that identify the first computing system, the second computing system, and a conversation identifier; and
   wherein the XML schema includes an element that specifies that the park-request element is allowed to include any XML elements.

5. The method of claim 4, wherein the park request specifies a target user and the unpark request specifies an orbit;
   wherein the method further comprises:
      paging the target user; and
      wherein sending the referral information comprises:
         sending the referral information when the unpark request specifies the orbit.

6. The method of claim 1, further comprising:
   receiving, by the parking server, additional services information from the first computing system, the additional services information specifying an additional service; and
   providing, by the parking server, the additional service to the second computing system while the conversation is parked.

7. The method of claim 1, wherein the protocol is an extension of the Session Initiation Protocol.

8. The method of claim 1, further comprising:
   sending an information message to the first computing system, the information message indicating a reason the conversation was unparked.

9. The method of claim 8, wherein the information message includes an unpark-notification element that conforms to an XML schema; and wherein the XML schema specifies that the unpark-notification element is allowed to indicate one of the following reasons the conversation was unparked: retrieval, hang-up, ringback, fallback, and drop.

10. The method of claim 1, further comprising:
sending a park notification message to a subscribed computing system, the park notification message identifying the conversation and indicating that the conversation was parked; and
sending an unpark notification message to the subscribed computing system, the unpark notification message identifying the conversation and indicating that the conversation was unparked.

11. The method of claim 10, further comprising:
sending an orbit change notification message to the subscribed computing system, the orbit change notification message indicating that an orbit of the conversation has changed.

12. The method of claim 1, further comprising:
receiving, by the parking server, an additional park request, the additional park request being a request to park an additional conversation, the additional conversation having a third modality, the third modality being different than the first modality and the second modality, the second park request conforming to the protocol;
receiving, by the parking server, an additional unpark request, the additional unpark request being a request to unpark the additional conversation; and
sending, by the parking server, additional referral information to an additional computing system, the additional referral information enabling the additional computing system to establish a communication session to carry the additional conversation.

13. The method of claim 1, wherein the conversation has at least one of the following modalities: video conferencing, instant messaging, chat, and application sharing.

14. A method comprising:
receiving, from a first computing system using a first modality, a park notification message that indicates that a conversation has been parked, the park notification message specifying an orbit of the conversation;
receiving, from a second computing system using a second modality that is different from the first modality, an unpark request, the unpark request being a request to unpark the conversation, the unpark request specifying the orbit, wherein the second computing system is a target computing system for the conversation;
sending to the second computing system, referral information wherein the referral information enables the second computing system to establish a communication session to carry the conversation;
receiving additional services information from the first computing system, the additional services information specifying an additional service; and
providing the additional service to the second computing system while the conversation is parked.

15. The method of claim 14, wherein the first modality is one of: a voice modality, a video conferencing modality, an instant messaging modality, a chat modality, and an application sharing modality.

16. The method of claim 14, wherein the orbit is an e-mail address of a user of the first computing system.

17. The method of claim 15, wherein the second modality is a different one of: the voice modality, the video conferencing modality, the instant messaging modality, the chat modality, and the application sharing modality.

18. The method of claim 14, further comprising sending an orbit change notification message to the second computing system, the orbit change notification message indicating that an orbit of the conversation has changed.

19. The method of claim 14, wherein the conversation has a plurality of modalities.

20. A computing system comprising:
a processing system; and
a memory that stores software instructions that, when executed by the processing system, cause the computing system to:
exchange conversation data with a second computing system, the conversation data representing information in a conversation enabled by the computing system using a first modality and the second computing system using a second modality that is different from the first modality;
send an invitation message to a parking server, the invitation message being a request to open a communication session between the computing system and the parking server, wherein the invitation message comprises a park-request element that requests to park the conversation and wherein the park-request element conforms to a first XML schema, and further wherein the park-request element comprises elements that specify data needed by the parking server to enable a target computing system to establish a communication session with the second computing system to carry the conversation;
receive a message indicating an orbit that identifies the target computing system; and
receive an information message from the parking server, wherein the information message includes an unpark-notification element that specifies that the conversation was unparked at by the target computing system wherein the unpark-notification element conforms to a second XML schema associated with the target computing system.

* * * * *